(12) United States Patent
Matsumoto et al.

(10) Patent No.: US 12,088,095 B2
(45) Date of Patent: Sep. 10, 2024

(54) DEMAND RESPONSE POWER SUPPLY METHOD AND ENERGY MANAGEMENT SYSTEM USING RELIABILITY INFORMATION

(71) Applicant: KYOCERA CORPORATION, Kyoto (JP)

(72) Inventors: Hiroyuki Matsumoto, Yokohama (JP); Mitsuo Ono, Mitaka (JP)

(73) Assignee: KYOCERA CORPORATION, Kyoto (JP)

( * ) Notice: Subject to any disclaimer, the term of this patent is extended or adjusted under 35 U.S.C. 154(b) by 527 days.

(21) Appl. No.: 17/389,245

(22) Filed: Jul. 29, 2021

(65) Prior Publication Data

US 2021/0359542 A1    Nov. 18, 2021

Related U.S. Application Data

(63) Continuation of application No. PCT/JP2020/002469, filed on Jan. 24, 2020.

(30) Foreign Application Priority Data

Jan. 30, 2019    (JP) ................................. 2019-014433

(51) Int. Cl.
 *H02J 13/00*    (2006.01)
 *H02J 3/14*    (2006.01)
 *H02J 3/46*    (2006.01)
(52) U.S. Cl.
 CPC ........ *H02J 13/00007* (2020.01); *H02J 3/144* (2020.01); *H02J 3/46* (2013.01)
(58) Field of Classification Search
 None
 See application file for complete search history.

(56) References Cited

U.S. PATENT DOCUMENTS

| | | | |
|---|---|---|---|
| 2012/0065802 A1* | 3/2012 | Seeber | H02J 13/00004 700/295 |
| 2014/0025218 A1* | 1/2014 | Nishi | H02J 3/28 700/295 |

(Continued)

FOREIGN PATENT DOCUMENTS

JP    201711968 A    1/2017

OTHER PUBLICATIONS

'Energy management system' Wikipedia entry, published Dec. 5, 2016 https://web.archive.org/web/20161227072222/https://en.wikipedia.org/wiki/Energy_management_system.*

*Primary Examiner* — Bernard G Lindsay
(74) *Attorney, Agent, or Firm* — HAUPTMAN HAM, LLP

(57) ABSTRACT

Provided is a power supply method including: an EMS 102B transmitting, to an EMS 102A, a search response including information relating to reliability of a second consumer in response to a search request; the EMS 102A transmitting, to the EMS 102B selected in accordance with the information relating to the reliability of the second consumer, a demand response request for requesting, using a demand response, a supply of electric energy having a designated value; the EMS 102B controlling a distributed power supply 101B or load equipment 103B managed by the EMS 102B so as to supply the electric energy having the designated value to a first consumer in response to the demand response request; and the EMS 102A transmitting, upon completion of the demand response, to the EMS 102B, a result request for requesting transmission of a response result upon the completion of the demand response.

7 Claims, 6 Drawing Sheets

(56) References Cited

U.S. PATENT DOCUMENTS

2014/0343983 A1* 11/2014 Narayan ............ G06Q 10/0631
                                                    705/7.12
2016/0054732 A1*  2/2016 Miyake ................ H04L 63/08
                                                    700/19
2018/0175620 A1*  6/2018 Fukuda ................ G06Q 10/063
2018/0212462 A1*  7/2018 Okino ................ G05B 19/0428

* cited by examiner

DEMAND RESPONSE POWER SUPPLY METHOD AND ENERGY MANAGEMENT SYSTEM USING RELIABILITY INFORMATION

RELATED APPLICATIONS

The present application is a continuation based on PCT Application No. PCT/JP2020/002469, filed on Jan. 24, 2020, which claims the benefit of Japanese Patent Application No. 2019-014433 filed on Jan. 30, 2019. The content of which is incorporated by reference herein in their entirety.

TECHNICAL FIELD

The present disclosure relates to a power supply method and an energy management system.

BACKGROUND ART

In recent years, in virtual power plants (VPP), demonstrations have been carried out in which demand response (DR) technology is applied to supply a desired electric energy from a response-side consumer to a demand-side consumer.

Specifically, the VPP in such a demonstration is realized by combining power storage apparatuses and energy management systems (EMSs) of each facility, and configured as a system to perform communication between each of the energy management systems and a server apparatus, using the Internet environment.

CITATION LIST

Patent Literature

Patent Document 1: Japanese application publication No. 2017-011968

SUMMARY

A first aspect of the present disclosure is a power supply method in which a first energy management system provided at a first consumer's facility transmits a search request, and a second energy management system provided at a second consumer's facility transmits, to the first energy management system, in response to the search request, a search response including information relating to reliability of the second consumer's facility. Furthermore, the first energy management system transmits, to the second energy management system selected in accordance with the search response including the information relating to the reliability of the second consumer's facility, a demand response request for requesting, using a demand response, a supply of electric energy having a designated value.

A second aspect of the present disclosure is an energy management system that functions as a first energy management system in a power supply system including the first energy management system provided at a first consumer's facility and a second energy management system provided at a second consumer's facility. The energy management system includes a searcher, a demand response processor, and a report acquirer. The searcher is configured to transmit a search request for searching for a consumer's facility capable of supplying electric energy to the first consumer's facility. The searcher is configured to receive, from the second energy management system, a search response including information relating to reliability of the second consumer's facility in response to the second energy management system receiving the search request. The demand response processor is configured to transmit, to the second energy management system selected in accordance with the information relating to the reliability of the second consumer's facility, a demand response request for requesting, using a demand response, a supply of electric energy having a designated value.

A third aspect of the present disclosure is an energy management system that functions as a second energy management system in a power supply system including a first energy management system provided at a first consumer's facility and the second energy management system provided at a second consumer's facility. The energy management system includes a responder, a demand response processor, and a report transmitter. The responder is configured to transmit, to the first energy management system, a search response including information relating to reliability of the second consumer's facility in response to a search request received from the first energy management system. The demand response processor is configured to receive, from the first energy management system, a demand response request for requesting, using a demand response, a supply of electric energy having a designated value.

DESCRIPTION OF EMBODIMENTS

Figure 1:
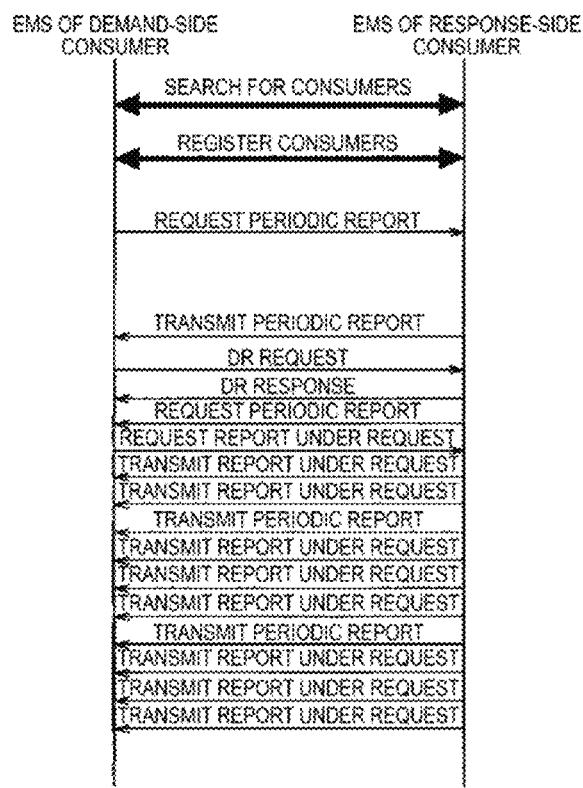
FIG. 1 is a diagram for describing a known technology.
Figure 2:
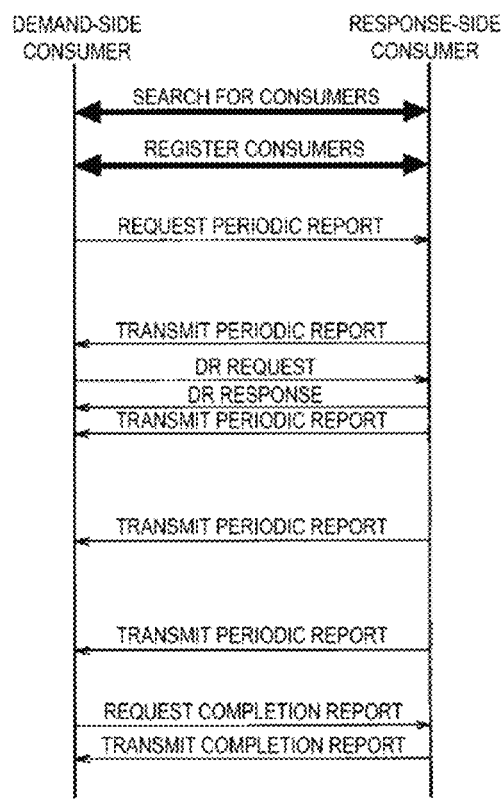
FIG. 2 is a diagram for describing a known technology.

An example of a sequence in such a VPP is illustrated in FIG. 1 and FIG. 2.

In a known VPP that supplies a desired electric energy from a response-side consumer to a demand-side consumer, there has been a problem in that a communication volume, and a processing volume in an EMS of the demand-side consumer increase due to reports transmitted from an EMS of the response-side consumer to the EMS of the demand-side consumer.

Specifically, in a sequence of a pattern 1 illustrated in FIG. 1, there is a problem in that the above-described communication volume and processing volume increase due to reports under request and periodic reports. Here, in the sequence of pattern 1 illustrated in FIG. 1, using the reports under request and the periodic reports, information is successively reported that indicates how much power is to be requested this time, of electric energy requested by a demand response, how much power has been supplied this time, and the like.

Similarly, in a sequence of a pattern 2 illustrated in FIG. 2, there is a problem in that the above-described communication volume and processing volume increase due to the periodic reports. Here, in the sequence of pattern 2 illustrated in FIG. 2 also, using the periodic reports, information is successively reported that indicates how much power is to be requested this time, of the electric energy requested by the demand response, how much power has been supplied this time, and the like. Further, in the sequence of pattern 2 illustrated in FIG. 2, using a completion report, it is reported that the demand response is complete.

The present disclosure has been made in light of the above-described problems, and when a desired electric energy is supplied from a response-side consumer to a demand-side consumer, the present disclosure can reduce an increase in a communication volume and an increase in a processing volume in an EMS of the demand-side consumer due to reports transmitted from an EMS of the response-side consumer to the EMS of the demand-side consumer.

A power supply system according to an embodiment of the present invention will be described below with reference to the drawings. Note that in the following description of the drawings, the same or similar components will be denoted by the same or similar reference signs.

First Embodiment

Figure 3:
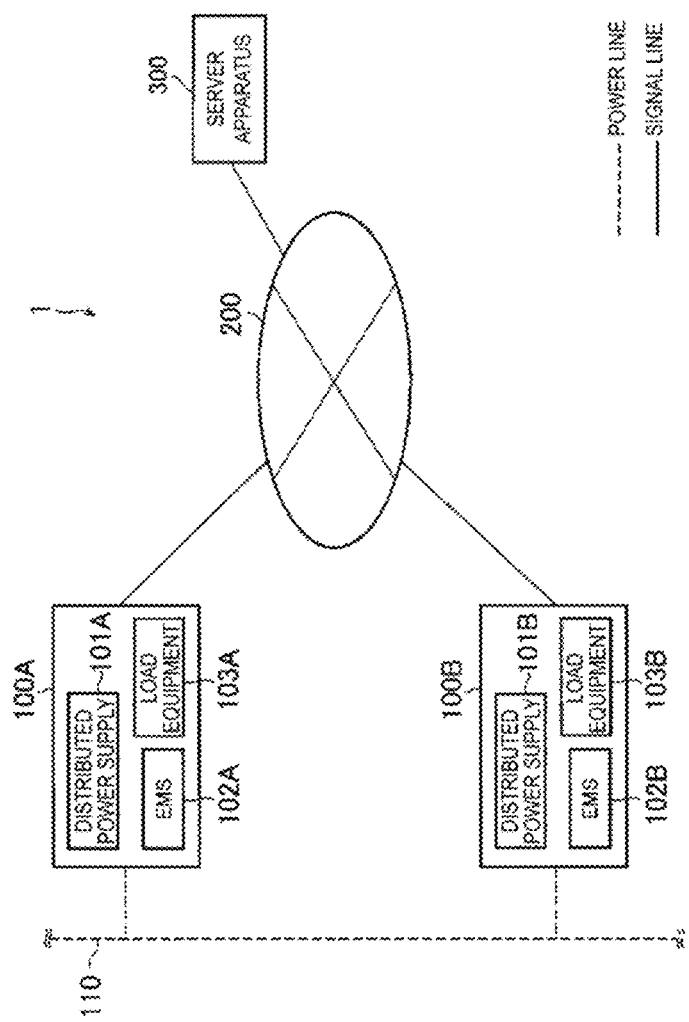
FIG. 3 is a diagram illustrating an example of an overall configuration of a power supply system 1 according to an embodiment.

A first embodiment of the present disclosure will be described below with reference to FIG. 2 to FIG. 6. FIG. 3 is a diagram illustrating an example of a configuration of a power supply system 1 according to the present embodiment. As illustrated in FIG. 3, the power supply system 1 includes a plurality of facilities 100A/100B and a server apparatus 300. Each of the facilities 100A/100B and the server apparatus 300 are connected to a network 200. The network 200 may include the Internet, or may include a dedicated line such as a virtual private network (VPN).

In FIG. 3, the facilities 100A/100B are exemplified as a plurality of facilities 100. Each of the facilities 100 corresponds to one consumer's facility (hereinafter simply referred to as a "consumer"). Each of the facilities 100A/100B is connected to a power grid 110.

A flow of power from the power grid 110 to the facility 100 is referred to as a "power flow," and the flow of power from the facility 100 to the power grid 110 is referred to as a "reverse power flow." The power grid 110 may be a power transmission network that is separated from power companies and provided externally to the consumers, in which the power is interchanged among the consumers in an area.

The facility 100A includes a distributed power supply 101A, an EMS 102A, and load equipment 103A, and the facility 100B includes a distributed power supply 101B, an EMS 102B, and load equipment 103B.

The distributed power supply 101A/101B may be a fuel cell apparatus that generates power using fuel. The fuel cell apparatus is an apparatus that generates power using fuel. For example, the fuel cell apparatus may be a solid oxide fuel cell (SOFC), a polymer electrolyte fuel cell (PEFC), a phosphoric acid fuel cell (PAFC), and/or a molten carbonate fuel cell (MCFC). Further, the distributed power supply 101A/101B may be a power generation apparatus that generates power using natural energy such as sunlight, wind power, water power, or geothermal heat. Further, the distributed power supply 101A/101B may be a power storage apparatus that performs power charging and power discharge.

The power storage apparatus is an apparatus that performs power charging and power discharge under the control of the EMS 102A/102B. For example, the power storage apparatus is a lithium ion power storage apparatus, a lead power storage apparatus, a nickel hydrogen power storage apparatus, or the like.

Note that the power discharged by the power storage apparatus may be supplied to the load equipment 103A/103B in the facility 100A/100B, or may be supplied to the power grid 110. Further, in the present embodiment, a "boost mode" may be implemented in which power generated by a power generation apparatus is sold, and the load equipment 103A/103B in the facility 100A/100B is operated by the power discharged by the power storage apparatus. The power storage apparatus can perform charging using power supplied by the power grid 110, or excess power generated by the power generation apparatus, for example.

The EMS 102A/102B is an energy management system that manages the power of the facility 100A/100B. The EMS 102A/102B may control operating states of the distributed power supply 101A/101B and load equipment 103A/103B. Specifically, the EMS 102A/102B may control the power charging or the power discharge of the power storage apparatus. The EMS 102A/102B is an example of a virtual end node (VEN).

The load equipment 103A/103B is equipment that consumes power. For example, the load equipment 103A/103B is air conditioning equipment, illumination equipment, audio visual (AV) equipment, or the like.

The server apparatus 300 is a server apparatus managed by a power company, such as a power generation operator, a power transmission and distribution operator, a retailer, or a resource aggregator. The resource aggregator is a power company that supplies power of the reverse power flow to the power generation operator, the power transmission and distribution operator, the retailer, or the like, in a VPP. In the present embodiment, the server apparatus 300 is an example of an entity that buys the power of the reverse power flow. In the present embodiment, the server apparatus 300 is configured to manage the facilities 100A/100B.

An example of a configuration of an EMS that functions as the EMS 102A (a first energy management system) in the power supply system 1 will be described below with reference to FIG. 4. Further, with reference to FIG. 5, an example of a configuration of an EMS that functions as the EMS 102B (a second energy management system) in the power supply system 1 will be described. Note that the EMS according to the present embodiment may have both the configuration of the EMS 102A and the configuration of the EMS 102B.

Figure 4:
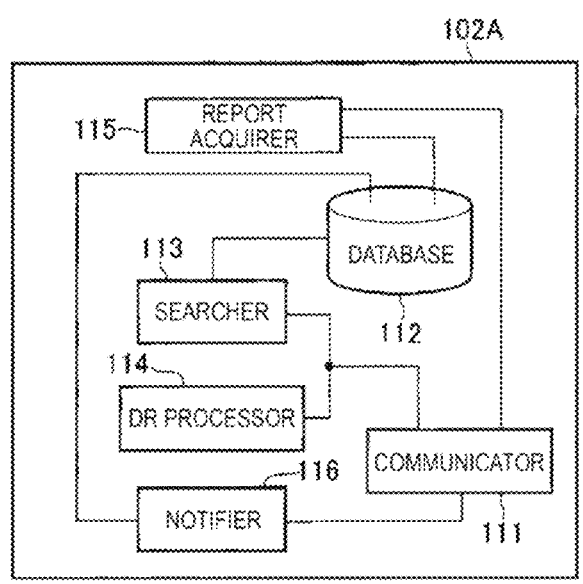
FIG. 4 is a diagram illustrating an example of a configuration of an energy management system 102A according to an embodiment.

As illustrated in FIG. 4, the EMS 102A includes a communicator 111, a database 112, a searcher 113, a DR processor 114, a report acquirer 115, and a notifier 116. Here, some or all of the searcher 113, the DR processor 114, the report acquirer 115, and the notifier 116 may be included in a controller (not illustrated) of the EMS 102A.

The communicator 111 is configured by a communication module, and communicates with the distributed power supply 101A and the load equipment 103A of the facility 100A, and with the server apparatus 300. The communicator 111 communicates with the server apparatus 300 in accordance with a first communication protocol. For example, as the first communication protocol, a communication protocol compliant with OpenADR 2.0, or a proprietary dedicated communication protocol can be used. On the other hand, the communicator 111 communicates with the distributed power supply 101A and the load equipment 103A in accordance with a second communication protocol. For example, as the second communication protocol, a communication protocol compliant with ECHONET Lite, Smart Energy Profile (SEP) 2.0, KNX, or a proprietary dedicated communication protocol can be used.

The database 112 is configured by a storage medium such as a non-volatile memory and/or an HDD, and stores data relating to the facility 100A.

The searcher 113 is configured to transmit a search request to the network 200 via the communicator 111. Here, the search request is a signal for searching for other consumers who can supply electric energy to the EMS 102A. Such a search request includes information indicating electric energy required at the facility 100A. Such a search request may be, for example, a signal prescribed by a communication protocol compliant with OpenADR 2.0.

Further, the searcher 113 is configured to receive a search response corresponding to the search request from an EMS of another facility 100, which is the EMS 102B in the present embodiment. Such a search response includes information indicating electric energy that can be supplied to a consumer of the facility 100A from the EMS 102B. Such a search response may be, for example, a signal prescribed by a communication protocol compliant with OpenADR 2.0.

Note that the searcher 113 may be configured to transmit, via the communicator 111, a signal notifying the network 200 that the searcher 113 has stopped accepting such a search response, after a predetermined time period has elapsed from the transmission of the above-described search request.

Further, the above-described search request may include information indicating a time period during which the above-described search response is accepted. Furthermore, the above-described search request may include information relating to a desired unit price of the power required by the consumer of the facility 100A, and/or reliability of the facility 100A (or of the consumer of the facility 100A).

Similarly, the above-described search response may include information relating to a desired unit price of power that can be supplied to the consumer of the facility 100A, and/or reliability of the facility 100B (or of the consumer of the facility 100B).

Further, the searcher 113 may be configured to be notified of an item that can be transmitted as a report, which will be described later, using such a search response.

The DR processor 114 is configured to transmit a demand response request to the EMS 102B via the communicator 111. Here, the demand response request is a signal for requesting, using a demand response, a supply of electric energy having a designated value. Such a demand response request may be, for example, a signal prescribed by a communication protocol compliant with OpenADR 2.0.

Further, the DR processor 114 may be configured to select, using a predetermined method, a consumer targeted by the demand response request, among a plurality of the consumers.

For example, the DR processor 114 may be configured to select the consumer targeted by the demand response request, using information relating to the reliability of each of the consumers. The DR processor 114 may be configured to acquire such information relating to the reliability from the server apparatus 300.

The report acquirer 115 is configured to transmit, via the communicator 111, a result request for requesting a transmission of a response result, to the EMS 102B, upon completion of the demand response. Such a result request may be, for example, a signal prescribed by a communication protocol compliant with OpenADR 2.0.

Further, the report acquirer 115 is configured to receive from the EMS 102B, via the communicator 111, a report regarding the above-described supply of electric energy having the designated value, in the form of the result response that transmits the response result. Such a result response may be, for example, a signal prescribed by a communication protocol compliant with OpenADR 2.0.

Note that the report acquirer 115 may be configured to determine the content of the result request based on the item that can be transmitted as the report notified by the search response.

The notifier 116 is configured to notify the server apparatus 300 of predetermined information via the communicator 111. Such predetermined information is information indicating past performance and/or an evaluation of the EMS 102B (the facility 100B or the consumer of the facility 100B) with respect to the above-described demand response request.

For example, the notifier 116 is configured to notify, as such predetermined information, at least one of an achievement rate with respect to the demand response request (a degree (%, for example) of the electric energy achieved during a request period, when the required electric energy is 100%) and an average dwell rate with respect to the demand response request. Here, the "dwell rate" is a percentage per unit time of a time period during which the electric energy supplied in response to the request has been within a certain range (±20% or 10%, for example) of the requested amount. The "average dwell rate" is a value obtained by averaging the dwell rates over a time period during which the demand response is being requested.

Here, the server apparatus 300 may be configured to calculate the above-described information relating to the reliability of each of the consumers based on such predetermined information.

Further, when it is determined that the content of such a report (the result response) cannot be trusted, the report acquirer 115 may be configured to perform an evaluation of the facility 100B (or the consumer of the facility 100B) by performing the sequence of the pattern 2 illustrated in FIG. 2. The notifier 116 may be configured to notify the server apparatus 300 of a result of such an evaluation and the content of the report, when the result of the evaluation differs from the content of the report. According to such a configuration, the evaluation of the facility 100B (or the consumer of the facility 100B) can be modified at the server apparatus 300.

Figure 5:
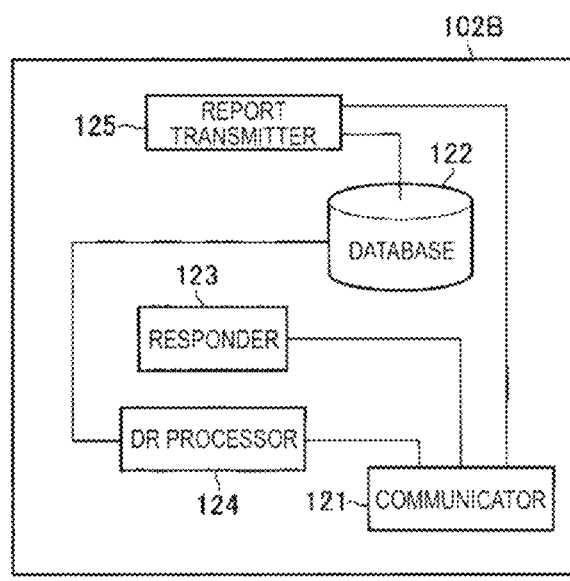
FIG. 5 is a diagram illustrating an example of a configuration of an energy management system 102B according to an embodiment.

As illustrated in FIG. 5, the EMS 102B includes a communicator 121, a database 122, a responder 123, a DR processor 124, and a report transmitter 125. Here, some or all of the communicator 121, the responder 123, the DR processor 124, and the report transmitter 125 may be included in the controller (not illustrated) of the EMS 102A.

The communicator 121 is configured by a communication module, and communicates with the distributed power supply 101B and the load equipment 103B of the facility 100B, and the server apparatus 300. The communicator 121 communicates with the server apparatus 300 in accordance with the first communication protocol. For example, as the first communication protocol, a communication protocol compliant with OpenADR 2.0, or a proprietary dedicated communication protocol can be used. On the other hand, the communicator 121 communicates with the distributed power supply 101B and the load equipment 103B in accordance with the second communication protocol. For example, as the second communication protocol, a communication protocol compliant with ECHONET Lite, SEP 2.0, KNX, or a proprietary dedicated communication protocol can be used.

The database 122 is configured by a storage medium such as a non-volatile memory and/or an HDD, and stores data relating to the facility 100B.

The responder 123 is configured to receive the search request from the EMS 102A via the communicator 121.

Further, in response to the search request received from the EMS 102A, the responder 123 is configured to transmit the search response to the EMS 102A via the communicator 121.

Here, the responder 123 may be configured to notify the EMS 102A, via the communicator 121, of the item that can be transmitted as the report, which will be described later, using such a search response.

For example, as such an item, the responder 123 may be configured to notify the EMS 102A of the achievement rate with respect to the demand response request (the degree (%, for example) of the electric energy achieved during the request period, when the required electric energy is 100%) at the EMS 102B, a maximum achievement rate with respect to the demand response request (a maximum value of the achievement rates per unit time during the request period) at the EMS 102B, a minimum achievement rate with respect to the demand response request (a minimum value of the achievement rates per unit time during the request period) at the EMS 102B, the average dwell rate with respect to the demand response request, a maximum electrical power error at the time of response (per one minute, for example) with respect to the demand response request, and/or the like. Here, the "dwell rate" is a percentage per unit time of a time period during which the electric energy supplied in response to the request has been within a certain range (±20% or 10%, for example) of the requested amount. The "average dwell rate" is a value obtained by averaging the dwell rates over a time period during which the demand response is being requested.

Here, the information relating to the reliability of each of the consumers may be at least one of the achievement rate with respect to the demand response request and the average dwell rate with respect to the demand response request.

Note that when the EMS 102B responds to the demand response request from the EMS 102A, a payment of money occurs as compensation for the supplied electric energy. Therefore, according to the above-described configuration, it is possible to understand the degree of achievement with respect to the demand response request based on the content of each of the items, and it is also possible to reduce an amount of the compensation as necessary.

The DR processor 124 is configured to receive the demand response request from the EMS 102A via the communicator 121.

Further, the DR processor 124 is configured to control the distributed power supply 101B or the load equipment 103B managed by the EMS 102B, so as to supply, to the EMS 102A, the electric energy having the designated value requested by the demand response request, in response to the demand response request received from the EMS 102A.

The report transmitter 125 is configured to receive the result request from the EMS 102A via the communicator 121, upon completion of the demand response.

Further, the report transmitter 125 is configured to transmit, via the communicator 121, the report regarding the above-described electric energy having the designated value, to the EMS 102A using the result response, in response to the result request received from the EMS 102A.

Furthermore, the report transmitter 125 may be configured to determine the content of such a report based on the item that can be transmitted as the report, which has been notified to the EMS 102A by the search response, and on the result request.

Note that the present embodiment may be configured such that information regarding the above-described compensation for the demand response request is transmitted and received between the server apparatus 300 and the EMSs 102A/102B, using a different protocol.

An example of a power supply method according to the present embodiment will be described below with reference to FIG. 6.

Figure 6:
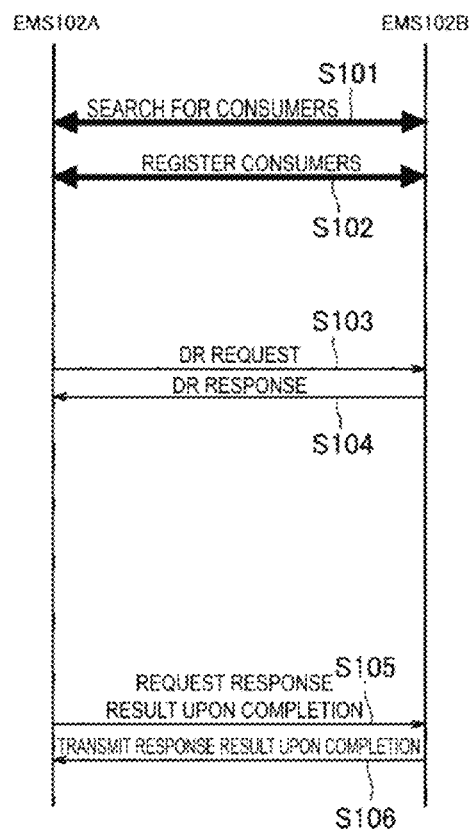
FIG. 6 is a flowchart illustrating an example of a power supply method according to an embodiment.

As illustrated in FIG. 6, at step S101, the EMS 102A transmits the search request, and at step S102, the EMS 102B, which has received the search request, transmits the search response corresponding to the search request to the EMS 102A.

At step S103, the EMS 102A selects the EMS 102B among the EMSs that have received the search response, and transmits the demand response request to the EMS 102B.

At step S104, the EMS 102B controls the distributed power supply 101B or the load equipment 103B managed by the EMS 102B so as to supply, to the EMS 102A, the electric energy having the designated value requested by the demand response request.

At step S105, the EMS 102A transmits the result request to the EMS 102B upon completion of the demand response.

At step S106, in response to the result request, the EMS 102B transmits, to the EMS 102A, the report regarding the above-described supply of the electric energy having the designated value, using the result response.

According to the present embodiment, it is possible to reduce an increase in a communication volume and an increase in a processing volume at the EMS, when the desired electric energy is supplied from a response-side consumer (the facility 100B) to the demand-side consumer (the facility 100A). Note that, as described above, the term "response" is used in the present specification, but since the term "response" means "to respond and operate," the term "reaction" may be used instead of "response."

Although the present disclosure is described by the above-described embodiment, it should not be understood that the description and the drawings, which form a part of this disclosure, limit this invention. Various alternative embodiments, examples, and operational techniques will be apparent to those skilled in the art from this disclosure.

In the embodiment, a case is exemplified in which the server apparatus 300 manages the plurality of facilities 100. However, the server apparatus 300 may manage one of the facilities 100. In such a case, the server apparatus 300 may be an EMS 102.

Although not specifically mentioned in the embodiment, the EMS 102 provided at the facility 100 need not necessarily be provided in the facility 100. For example, some functions of the EMS 102 may be provided by a cloud server provided on the Internet. In other words, it may be considered that the EMS 102 includes the cloud server.

In the embodiment, a case is exemplified in which the first communication protocol is the protocol compliant with OpenADR 2.0, and the second communication protocol is the protocol compliant with ECHONET Lite, SEP 2.0, or KNX. However, the embodiment is not limited to this example. It is sufficient that the first communication protocol be a protocol standardized as a protocol used for communication between the server apparatus 300 and the EMS 102.

It is sufficient that the second communication protocol be a protocol standardized as a protocol used at the facility 100.

The invention claimed is:

1. A power supply method, comprising:
    transmitting, by a first energy management system provided at a first consumer's facility, a search request, the first energy management system including a first server apparatus;
    in response to the search request, transmitting, by each of a plurality of second energy management systems respectively provided at a plurality of second consumer's facilities, to the first energy management system, a search response including information relating to reliability of a corresponding second consumer's facility among the plurality of second consumer's facilities, each of the plurality of second energy management systems including a second server apparatus;
    selecting a second energy management system among the plurality of second energy management systems in accordance with the information relating to the reliability of the plurality of second consumer's facilities;
    transmitting, by the first energy management system, to the selected second energy management system, a demand response request for requesting, using a demand response, a supply of electric energy having a designated value;
    in response to the demand response request, controlling, by the selected second energy management system, at least one of a distributed power supply and load equipment managed by the selected second energy management system, to supply the electric energy having the designated value to the first consumer's facility; and
    transmitting, by the first energy management system, to the selected second energy management system, a result request requesting transmission of a response result upon the completion of the demand response.

2. The power supply method according to claim 1, wherein
    the information relating to the reliability of the corresponding second consumer's facility of each of the plurality of second energy management systems is at least one of an achievement rate with respect to the demand response request or an average dwell rate with respect to the demand response request, and
    the average dwell rate is a percentage of a time period during which electric energy supplied in response to a request being within a predetermined range with respect to a requested amount.

3. The power supply method according to claim 1, further comprising:
    transmitting, by the selected second energy management system, to the first energy management system, in response to the result request, a report regarding the supply of the electric energy having the designated value, using a result response that transmits a response result upon the completion of the demand response.

4. The power supply method according to claim 3, wherein
    when transmitting the search response, each of the plurality of second energy management systems transmits the report to notify the first energy management system, using the search response.

5. The power supply method according to claim 3, wherein
    when transmitting the report, the selected second energy management system transmits, to the first energy management system, the reliability of the corresponding second consumer's facility as the report.

6. An energy management system configured as a first energy management system in a power supply system including the first energy management system provided at a first consumer's facility and a plurality of second energy management systems respectively provided at a plurality of second consumer's facilities, the energy management system comprising:
    a server apparatus configured to
        transmit a search request for searching for a consumer's facility capable of supplying electric energy to the first consumer's facility;
        receive, from each of the plurality of second energy management systems, a search response responsssive to the search request and including information relating to reliability of a corresponding second consumer's facility among the plurality of second consumer's facilities;
        select a second energy management system among the plurality of second energy management systems in accordance with the information relating to the reliability of the plurality of second consumer's facilities;
        transmit, to the selected second energy management system, a demand response request for requesting, using a demand response, a supply of electric energy having a designated value; and
        transmitting, to the selected second energy management system, a result request requesting transmission of a response result upon the completion of the demand response,
    wherein the first consumer's facility provided with the first energy management system receives, in response to the demand response request, the electric energy having the designated value from at least one of a distributed power supply and load equipment managed by the selected second energy management system.

7. An energy management system configured as a second energy management system in a power supply system including a first energy management system provided at a first consumer's facility and a plurality of second energy management systems including the second energy management system, each of the plurality of second energy management systems being provided at a corresponding second consumer's facility among a plurality of second consumer's facilities, the energy management system comprising:
    a server apparatus configured to
        transmit, to the first energy management system, a search response including information relating to reliability of the corresponding second consumer's facility in response to a search request received from the first energy management system;
        receive, from the first energy management system and as a result of the second energy management system being selected, in accordance with the information relating to the reliability, to supply electric energy to the first consumer's facility, a demand response request for requesting, using a demand response, a supply of electric energy having a designated value;
        in response to the demand response request, control at least one of a distributed power supply and load equipment managed by the second energy management system to supply the electric energy having the designated value to the first consumer's facility; and receive, from the first energy management system, a result request requesting transmission of a response result upon the completion of the demand response.

\* \* \* \* \*